Dec. 15, 1931. C. T. RIDGELY 1,836,396
PAPER TRIMMER
Filed Sept. 29, 1930 2 Sheets-Sheet 1
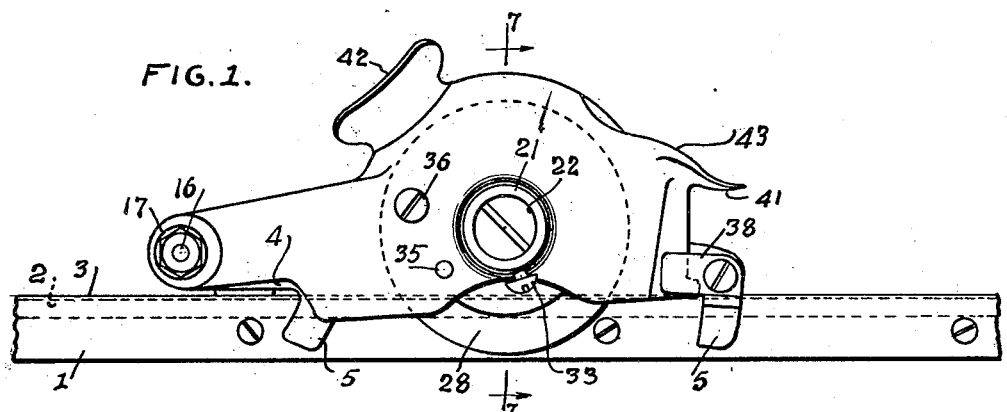
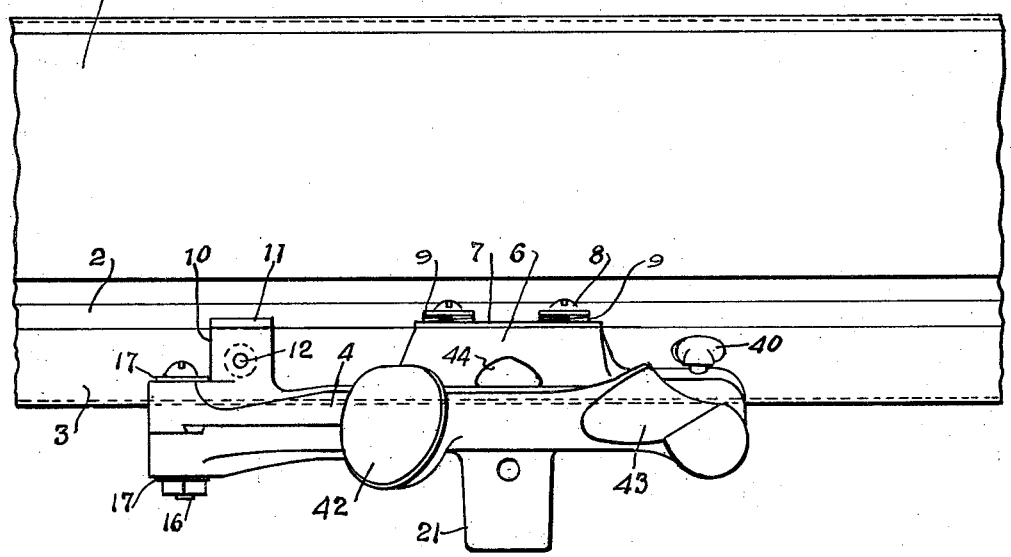
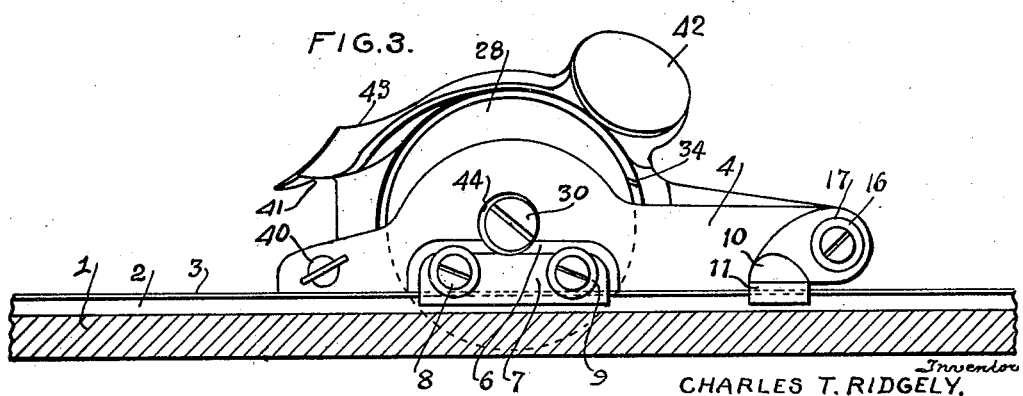
Inventor
CHARLES T. RIDGELY,
By Toulmin & Toulmin
Attorneys

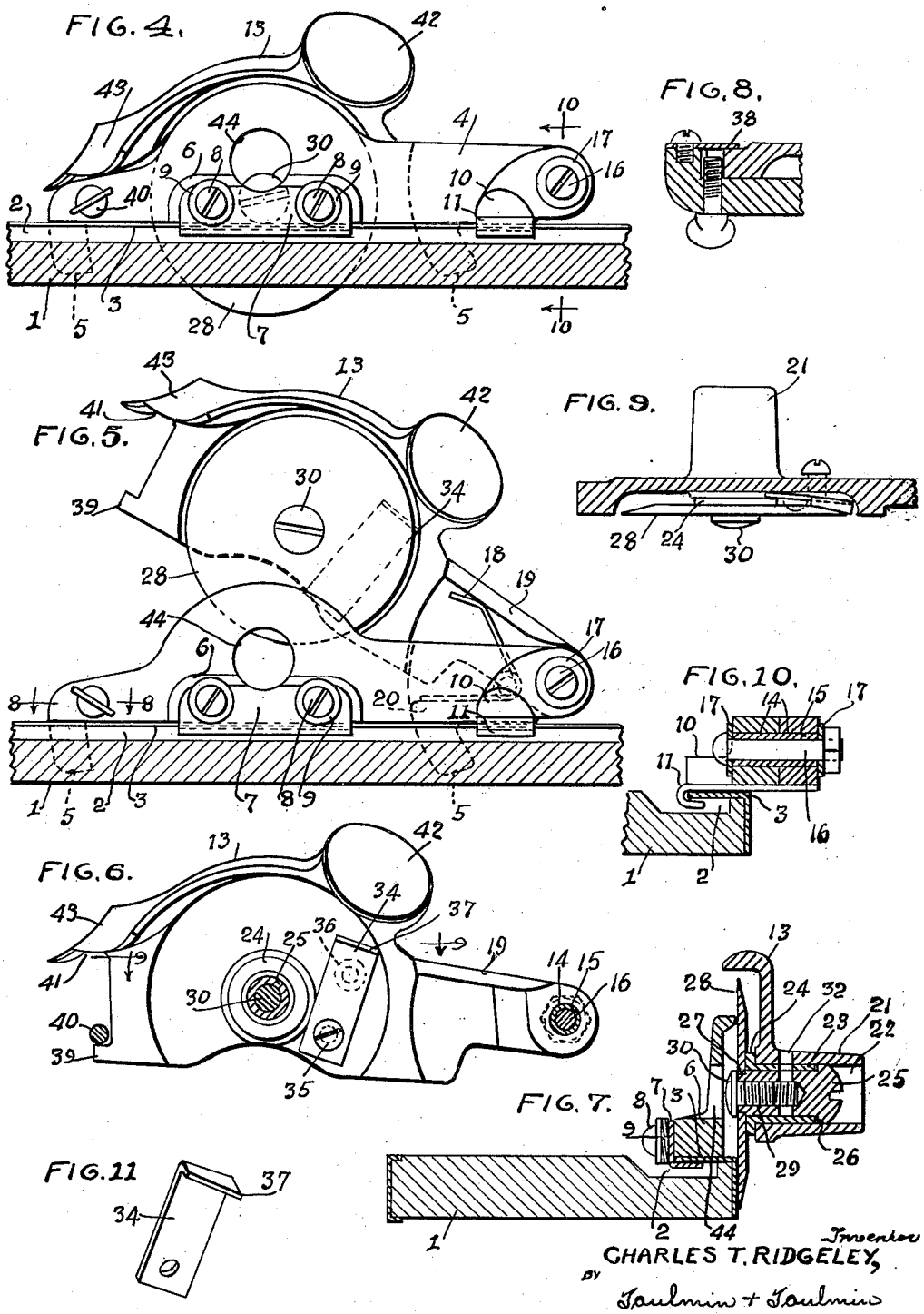

Patented Dec. 15, 1931

1,836,396

UNITED STATES PATENT OFFICE

CHARLES T. RIDGELY, OF SPRINGFIELD, OHIO, ASSIGNOR TO RIDGELY AND DUGDALE COMPANY, OF SPRINGFIELD, OHIO, A PARTNERSHIP COMPOSED OF CHARLES T. RIDGELY AND W. H. DUGDALE

PAPER TRIMMER

Application filed September 29, 1930. Serial No. 484,981.

This invention relates to improvements in paper trimmers, and has for its object to provide a hand-operated trimmer mounted upon a straight edge or guide for use in cutting off unused parts of wall paper, and may be, in fact, used for cutting paper in other places under other conditions.

It is particularly the object of this invention to provide, in connection with a straight edge, a gauge member adapted to be moved along the straight edge for the purpose of cutting paper underneath the straight edge and along one edge thereof.

It is a further object of this invention to provide, in connection with a gauge or traveling member, a pivotally supported cutter case carrying a rotating cutter, and means to limit the movement of the cutter blade so that it is always in position for operation.

It is a further object of this invention to provide, in connection with a trimmer of this kind, means for removing from a rotating blade any paste or other foreign matter that may be gathered thereon.

It is also an object of this invention to provide, in connection with a gauge member adapted to move along one edge of the straight edge or track, means to cause the gauge member to stop in case any obstruction, such as a nail, screw or tack, may project from the cutting edge of the members supporting the gauge members. By this means the cutter is protected and prevented from coming in contact with an obstructing object.

Another object of this invention is to provide, in connection with a gauge member, depressions therein forming seats to be engaged by a thumb and finger of the operator's hands for pressing the cutter against the paper to be trimmed.

It is also an object of this invention to provide, in connection with the gauge member, a hub in which the spindle of the rotating blade is mounted, the hub not only acting to support the rotating of the cutter but also serving as a finger grip by which the gauge may be elevated when it is desired to reposition the trimmer.

The case and gauge being pivoted at the heel, provides the necessary leverage to force the cutting blade through the material being cut with no possible chance of raising or pivoting the straight edge when extreme pressure is put on the trimmer. The rests are so placed on the case that when operating the trimmer the cutting blade is straddled by thumb and fingers, thus giving direct down pressure on the case that operates the blade, which means no energy is wasted and every ounce of pressure is accounted for.

Referring to the drawings:

Figure 1 is a side elevation of the apparatus looking in the direction of the cutting side of the straight edge.

Figure 2 is a top plan view of the apparatus as shown in Figure 1.

Figure 3 is a side elevation of the apparatus and a section through the straight edge, showing the manner in which the apparatus is supported on the straight edge. In this view the cutter blade is out of cutting position.

Figure 4 is a view similar to Figure 3 but with the cutting blade in lowered or cutting position.

Figure 5 is a view similar to Figures 3 and 4 but with the blade-carrying arm in its extreme elevated position.

Figure 6 is a side elevation of the cutter case removed from the gauge member.

Figure 7 is a section on the line 7—7 of Figure 1.

Figure 8 is a section on the line 8—8 of Figure 5.

Figure 9 is a section on the line 9—9 of Figure 6.

Figure 10 is a section on the line 10—10 of Figure 4.

Figure 11 is a view showing the scraper blade for cleaning the cutter blade.

This apparatus is composed of essentially four parts, a straight edge, which affords a trackway upon which there is mounted a gauge member. On the gauge member there is pivotally mounted a cutter case which carries a rotating blade. When this apparatus is in place the straight edge 1, which may be of any desired or convenient length, is placed along the paper with the edge abutting the line along which the paper is to be trimmed or cut. On this straight edge is a groove 2 which is adjacent one edge thereof. Extending up the edge of the straight edge, adjacent the groove and bent over to partly cover the groove, is a straight edge track 3 of some suitable metal, such as brass or any other light metal.

Upon this trackway there is located, for longitudinal movement thereon, a gauge member or traveling member 4, which has on one side thereof guides 5 to properly locate the traveling member with regard to the straight edge. Extending from the other side of the gauge member from the guides and at substantially a right angle thereto is a front bar 6, which has on the outer edge thereof a flange plate 7 held by means of screws 8. This flange member first extends downwardly and then toward the guide members beneath the track 3 for the purpose of holding the apparatus on the track. For the purpose of permitting an automatic adjustment of the plate to allow for slight variations in the wear of the track by the flange plate 7 and the front bar 6, split spring washers 9 are provided. These washers may be of different thicknesses.

Extending from the rear of the gauge member is a second bar 10, which has attached to the lower edge thereof a flange 11. This flange is bent down and beneath the track part of the straight edge, and assists in holding the apparatus in position on the track. By means of these two flanges and the two guides the apparatus is held in proper alignment on the track so that in operation it moves in substantially a straight line from one end to the other of the straight edge. The rear flange is held in position by means of a rivet 12.

Pivotally mounted at one end to one end of the gauge member is a cutter case 13. This cutter case is in the form of an arm pivoted at one end to the gauge member and may swing up and down, due to the pivotal connection between the two. In the adjacent ends of the gauge member and the cutter case are holes 14 in which there is a tube 15. This tube in length is substantially the same as the length of the hole through the gauge member and the cutter case when they are side by side at the point where the holes are. Extending through the tube is a bolt 16, which has on one end a head and on the other end a nut. Between the head and one end of the tube and the nut and the other end of the tube is a washer 17. These washers do not bind the gauge member and the cutter case but fit snugly against the ends of the tube and close up to the gauge member and the cutter case so that these parts may move easily, but no unnecessary movement is permitted.

In order to hold the cutter case in elevated position, such as that shown in Figure 5, and to raise the cutter case when the hand is removed from the engaging parts thereof, there is provided a spring 18 which is looped in the center forming two arms, one arm engaging a flange 19 on the cutter case, while the other arm engages a ledge 20 on the lower edge of the gauge member. This spring is shown in Figure 5, and as shown there is just sufficiently strong to raise the cutter case in its most elevated position free from the paper to be cut or trimmed.

Extending from one side of the cutter case is a hub member 21, which has a horizontal hole 22 therein. In this hole is a bushing 23 composed of brass or some other suitable material. On one end of this bushing is a flange 24 which abuts a face of the cutter case, with the other end extending into the hole 22 but not reaching the other end thereof. Rotating or working within the bushing is a spindle 25, which has on one end a shoulder 26 adapted to abut against the end of the bushing within the hole 22. On the end of the spindle remote from the shoulder is a boss 27. This boss is nothing more than a reduced part of the spindle to provide a seat and a shoulder for holding the cutter blade 28 in place, which has a hole to receive the boss.

Extending longitudinally into the spindle from the boss end thereof is a hole 29 to receive a screw 30, which has a head to engage one face of the cutter blade to hold the cutter blade in position on the boss and against the shoulder formed by the boss on the spindle. The spindle and screw 30 each has a slot 31 therein to receive a screw driver so that the blade may be removed for replacement or for sharpening. The bushing is driven into the hole 22 so that it cannot rotate therein, and provides ample bearing for the spindle or arbor 25. This structure is shown in Figure 7.

When the spindle has on the reduced end thereof the cutter blade and has within the hole 29 the screw 30 the parts are held in position so that the blade will rotate without wobbling or sidewise movement. Extending through the upper part of the hub, one side of the bushing and through the spindle is a hole 32. This hole may be used for oiling the spindle, or it may be used for the insertion of a nail or some other object to prevent the spindle rotating when it is desired to remove the screw 30 so that the cutter may be taken off of the spindle. The bushing may also be held by means of a screw 33, as shown in Figure 1.

In cutting or trimming wall paper, where paste has been used, the edge of the cutter blade is likely to become smeared with paste and colored by the coloring matter in the paper. The paste causes the edge of the blade to become rounded and the coloring matter may be transferred to the cut edge of the paper, so that a streak is left on the papered surface. For cleaning the blade there is provided a scraper 34 attached to the cutter case by means of a screw 35, as shown in Figure 1. In order to adjust the scraping end of this blade with relation to the surface of the cutter blade there is an adjusting screw 36. This screw fits through the body of the cutter case and engages the scraper so that its position in regard to the cutter blade may be adjusted. The scraping end of the scraper is indicated by the numeral 37 and is at a right angle to the body of the scraper, and has its edge formed to conform to the surface of the cutter blade and slightly extending beyond the edge of the blade.

For the purpose of guiding the forward end of the cutter case as it moves up and down in the operation of the apparatus, there is provided a plate 38 adjacent the front guide 5. There is also located at the front end of the cutter case, on the lower edge thereof, a lug 39 which is to be engaged by a screw 40 located in the front end of the gauge member to limit the upward movement of the cutter case. This screw and lug permit the front end of the cutter case, under the influence of the spring 18, to rise to a position shown in Figure 1. In this position the cutter blade is above the lower face of the straight edge so that it is out of contact with any paper or other object underneath the straight edge. By removing this screw the cutter case may be forced to the position shown in Figure 5 through the action of the spring 18.

In order to limit the downward movement of the front end of the cutter case there is a stop member 41, which engages some part of the upper surface of the front end of the gauge member. On the top of the cutter case are two seats 42, a thumb seat, and 43 a forefinger seat. When the operator is manipulating this apparatus the thumb of the right hand is placed on seat 42 and the forefinger on seat 43. With his hand and fingers in this position the apparatus is pushed along the straight edge and pressed down so that the rotating blade cuts or trims the paper.

When it is desired to remove or elevate the cutting blade from the material trimmed or cut, the middle finger of the operator's hand is gripped beneath the hub so that the blade is raised to the position shown in Figure 5, and at the same time the trimmer is flipped to starting end of the straight edge. While the spring 18 under normal conditions would elevate the cutter case, yet if the blade should become stuck the operator's middle finger beneath the hub assists the spring and raises the cutter case so that the whole apparatus may be removed to another place, or properly adjusted.

In order to facilitate the removal of the cutter blade there is provided in the gauge member opposite the screw 30 a hole 44. The relative positions of the hole 44 and the screw 30 are shown in Figure 3, when the apparatus is in non-cutting position. At this time the screw 30 may be removed so that the blade may be taken off of the spindle or it may be operated to tighten the blade on the spindle.

The material used for making the different parts of this apparatus is such that durability, lightness and strength are effected. All parts except wearing parts may be made of light material. This apparatus in a finished condition is about four inches long and weighs about six ounces. It is obvious, therefore, that it is easily operated and may be carried about in a person's pocket when free or removed from the straight edge.

I desire to comprehend within my invention such modifications as may be clearly embraced within my claims and the scope of my invention.

Having thus fully described my invention, what I claim is new and desire to secure by Letters Patent, is:

1. In a paper trimmer, in combination with a guide, a traveling member supported by said guide, a cutter case supported by said member for movement independent thereof and having a hub with a hole therein, a bushing having a flange at one end in said hole, a spindle in said bushing, said spindle having a shoulder on one end engaging the other end of the bushing, and a cutter blade on the other end of said spindle engaging the flange on the bushing.

2. In a paper trimmer, in combination with a guide, a traveling member supported by said guide, a cutter case supported by said member for movement thereon, said case having a hub with a hole therein, a bushing in said hole, said bushing having a flange on one end engaging one side of the case, a spindle in said bushing having a shoulder engaging one end of said bushing, and a cutter on the other end of said spindle and engaging said flange.

3. In a paper trimmer, in combination with a guide, a gauge member adapted to travel on said guide, a cutter case pivoted at one end to one end of the gauge member, a cutter blade on said case, means to limit the movement of the cutter case about the pivot, and a plate on the gauge member to hold the other end of the cutter case against the gauge member.

4. In a paper trimmer, in combination with a guide, a gauge member having a hole in one end and adapted to travel on said guide, a cutter case having a hole in one end, a tube in said holes, a bolt in said tube, and a cutter blade carried by said cutter case.

5. In a paper trimmer, in combination with a guide, a gauge member adapted to travel on said guide, a cutter case mounted on said gauge member for vertical movement, a rotating cutter blade on said cutter base, and a scraper blade engaging said cutter blade to clean it.

6. In a paper trimmer, in combination with a guide having a groove and a track extending over the groove, a gauge member on said track with guide means engaging one side of said track and a spring-pressed flange engaging that part of the track extending over the groove, and a cutter blade supported by the gauge member and adjacent the track.

7. In a paper trimmer, in combination with a guide having a groove and a track extending over the groove, a cutter member supported by said track for movement thereon, and a spring-pressed flange engaging the track over the groove for holding the cutter member on the track.

8. In a paper trimmer, in combination with a track, a cutter member supported on said track for movement thereon, a flange having holes therein engaging said track, screws extending through said holes into the cutter member, and spring means on the screws for holding the flange against the track.

9. In a paper trimmer, in combination with a track, a cutter member mounted on said track for movement thereon, a plurality of flanges engaging the track for holding the cutter member thereon, and spring means tending to press one of said flanges against the track.

In testimony whereof, I affix my signature.

CHARLES T. RIDGELY.